(12) United States Patent
Ishikawa et al.

(10) Patent No.: US 10,174,864 B2
(45) Date of Patent: Jan. 8, 2019

(54) FLUID CONTROLLER HEATING APPARATUS AND FLUID CONTROL APPARATUS

(71) Applicant: FUJIKIN INCORPORATED, Osaka-shi (JP)

(72) Inventors: Tomoyuki Ishikawa, Tokyo (JP); Masahiko Ochiishi, Osaka (JP); Takahiro Matsuda, Osaka (JP)

(73) Assignee: FUJIKIN INCORPORATED, Osaka-shi (JP)

( * ) Notice: Subject to any disclaimer, the term of this patent is extended or adjusted under 35 U.S.C. 154(b) by 18 days.

(21) Appl. No.: 15/300,387

(22) PCT Filed: Oct. 22, 2015

(86) PCT No.: PCT/JP2015/079809
§ 371 (c)(1),
(2) Date: Sep. 29, 2016

(87) PCT Pub. No.: WO2016/068010
PCT Pub. Date: May 6, 2016

(65) Prior Publication Data
US 2017/0184220 A1 Jun. 29, 2017

(30) Foreign Application Priority Data
Oct. 29, 2014 (JP) .................................. 2014-219880

(51) Int. Cl.
*F16K 49/00* (2006.01)

(52) U.S. Cl.
CPC ....... *F16K 49/002* (2013.01); *Y10T 137/6606* (2015.04)

(58) Field of Classification Search
CPC .. F16K 49/002; F16K 49/00; Y10T 137/6416; Y10T 137/6606
(Continued)

(56) References Cited

U.S. PATENT DOCUMENTS

| 4,194,536 A * | 3/1980 | Stine ...................... F16L 59/145 |
| | | 138/103 |
| 5,012,839 A * | 5/1991 | Rogers .................... B29C 45/28 |
| | | 137/341 |

(Continued)

FOREIGN PATENT DOCUMENTS

| JP | 60-185799 U1 | 12/1985 |
| JP | 64-025597 U1 | 2/1989 |

(Continued)

OTHER PUBLICATIONS

International Search Report dated Jan. 19, 2016, issued for PCT/JP2015/079809.

*Primary Examiner* — Matthew W Jellett
*Assistant Examiner* — Jonathan Waddy
(74) *Attorney, Agent, or Firm* — Locke Lord LLP

(57) ABSTRACT

A fluid controller heating apparatus includes a cylindrical heater unit that surrounds a portion of an opening-and-closing valve to be heated, and a heat insulation jacket that surrounds the heater unit. The heater unit includes a pair of heat-transfer members to which plate-shaped heaters are fixed, respectively. The heat-transfer members are mounted so as to hold the opening-and-closing valve therebetween from both sides and are capable of being coupled to each other with a screw member. The heat insulation jacket is a cylindrical integrated product.

3 Claims, 6 Drawing Sheets

(58) Field of Classification Search
USPC .................................................. 137/334, 341
See application file for complete search history.

(56) References Cited

U.S. PATENT DOCUMENTS

| | | | | |
|---|---|---|---|---|
| 5,224,510 A * | 7/1993 | Pericles | ................ | F16K 31/004 137/341 |
| 5,440,887 A * | 8/1995 | Nishizato | ................ | B01F 3/022 137/341 |
| 6,060,691 A | 5/2000 | Minami et al. | | |
| 6,358,414 B1 * | 3/2002 | Maiefski | ................ | B01D 15/08 137/334 |
| 8,555,733 B2 * | 10/2013 | Shock | ................... | G01N 1/22 137/334 |
| 2003/0005959 A1 * | 1/2003 | Yamaji | ................ | F16K 27/003 137/341 |
| 2005/0229972 A1 * | 10/2005 | Hoshi | ................ | F16K 27/003 137/341 |
| 2006/0225788 A1 * | 10/2006 | Hiratsuka | ................ | F16K 49/00 137/341 |
| 2007/0110415 A1 | 5/2007 | Tanikawa et al. | | |
| 2007/0169819 A1 | 7/2007 | Shikata et al. | | |
| 2009/0277510 A1 * | 11/2009 | Shikata | ................ | F16K 27/003 137/334 |
| 2013/0104992 A1 * | 5/2013 | Yednak, III | ....... | C23C 16/45561 137/1 |
| 2015/0337985 A1 * | 11/2015 | Doya | ..................... | F16K 49/00 137/334 |

FOREIGN PATENT DOCUMENTS

| | | |
|---|---|---|
| JP | 05-050290 U | 7/1993 |
| JP | 06-040594 U | 5/1994 |
| JP | 10-299943 A | 11/1998 |
| JP | 2004-340199 A | 12/2004 |
| JP | 2005-098347 A | 4/2005 |

* cited by examiner

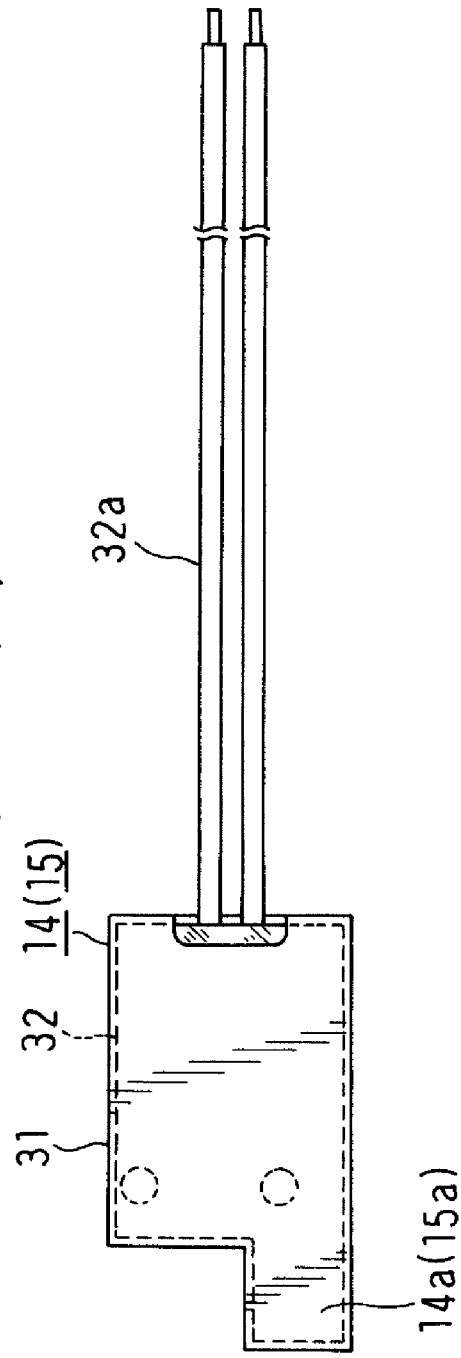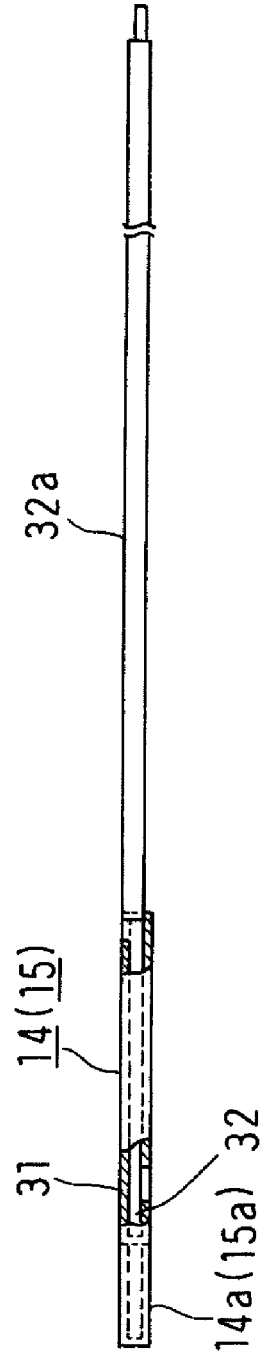

FLUID CONTROLLER HEATING APPARATUS AND FLUID CONTROL APPARATUS

TECHNICAL FIELD

The present invention relates to a fluid controller heating apparatus configured to heat a fluid controller such as a valve, and a fluid control apparatus provided with such a fluid controller heating apparatus.

BACKGROUND ART

In the related art, PTL 1 discloses a fluid controller heating apparatus configured to heat a fluid controller such as a valve, including: a pair of plate-shaped side heaters which are in abutment with a pair of opposing side surfaces of a fluid controller body to be heated via insulating layers; a pair of side holding members each having a side heater fitting depression and configured to hold the fluid controller body therebetween from both sides by being coupled with each other with a screw; and cushion members interposed between the side heaters and bottom surfaces of the side heater fitting depression and configured to press the side heaters toward side surfaces of the fluid controller body.

PTL 2 discloses a heating apparatus provided on a fluid control apparatus which is connected to a mass flow controller and an opening-and-closing valve without intermediary of a tube (of so-called an integrated type), including: planer heaters disposed on both sides of a line and configured to heat the fluid controllers and a joint member; and heat retaining plates that come into abutment respectively with outsides of the planar heaters, wherein the heat retaining plates are coupled to each other with screw members.

CITATION LIST

Patent Literature

PTL 1: JP-A-10-299943
PTL 2: JP-A-2004-340199

SUMMARY OF INVENTION

Technical Problem

The heating apparatus disclosed in PTL 2 described above has a problem that the heaters do not correspond to the individual fluid controllers in shape, and thus heating performance is not good. In contrast, although the fluid controller heating apparatus of PTL 1 described above is superior in heating performance, there is a problem that application to the integrated fluid control apparatus as in PTL 2 is difficult because a large space is required for installation. In the fluid control apparatus, a heat-insulation performance is important in order to prevent a fluid controller adjacent to the fluid controller to be heated from increasing in temperature too much. However, the configuration disclosed in PTL 2 has a problem of inferiority in heat insulating property.

It is an object of the present invention to provide a fluid controller heating apparatus that is superior in heating performance and heat-insulation performance and needs only a small space for installation, and a fluid control apparatus provided with such a fluid controller heating apparatus.

Solution to Problem

A fluid controller heating apparatus according to the present invention includes: a cylindrical heater unit surrounding a portion to be heated of a fluid controller, and a heat-insulation member surrounding the heater unit, wherein the heater unit includes a pair of heat-transfer members each of which has a heater fixed thereto, and the heat-transfer members are attached so as to hold the fluid controller therebetween from both sides and are capable of being coupled to each other, and the heat-insulation member is a cylindrical integrated product.

The fluid controller heating apparatus is suitable to be used in a fluid control apparatus provided with a plurality of lines formed by disposing the fluid controllers adjacent to each other in series and, specifically, is suitable for heating the fluid controller (for example, an opening-and-closing valve) disposed at an end of the line. With the fluid control apparatus having such a configuration, since the fluid controllers are disposed adjacent to each other in a direction of the line (fore-and-aft direction), it is difficult to mount the fluid controller heating apparatus in the fore-and-aft direction.

According to the fluid controller heating apparatus of the invention, the heater unit required for heating includes two members which are configured to hold the fluid controllers therebetween from both sides. Therefore, even when the plurality of fluid controllers are disposed in series and gaps between the adjacent fluid controllers are small, the pair of heat-transfer members with a heater may be mounted so as to hold the fluid controller to be heated therebetween from both sides in a direction orthogonal to the line, and may be installed easily from a direction orthogonal to the direction of the line. The heat-insulation member, which is a cylindrical integrated product, may be attached from above the line, for example, and thus may easily be installed.

In this manner, even in the case where another fluid controller is provided adjacent to the fluid controller to be heated and thus a space for installation is small, the heating apparatus may easily be installed. Since the heater unit has a cylindrical shape, the fluid controller to be heated may be heated not only from both sides of the fluid controller to be heated, but also from the entire circumference, so that a superior heating performance is achieved. In addition, since the heat-insulation member is a cylindrical integrated product, the fluid controllers adjacent to the fluid controller to be heated are prevented from increasing in temperature too much.

Each of the heat-transfer members is a block-shaped body provided with depressions corresponding to a portion to be heated of the fluid controller. The heaters are disposed on outer peripheral surfaces of each body so as to hold the fluid controller therebetween from both sides, and heat of each of the heaters is transferred to the fluid controller via the heat transfer member body.

The heat-insulation member may be a molded product that corresponds to the heater unit in shape as a matter of course, but more preferably is a flexible band-shaped sheet wound around the heater unit into a cylindrical shape.

In this configuration, the heat-insulation member having a flexibility may be attached easily even the space is small, so that a configuration superior not only in heat insulating property, but also in installability is achieved. The heat-insulation member may be fixed to the heat-transfer members with a heater with an adhesive agent. More preferably, however, the heat-insulation members are coupled to each other so as to be easily removable with a band-shaped magic tape (registered trademark) provided on both ends of the heat-insulation member. A fixing structure with a screw may also be employed without problem as a matter of course.

The heat-transfer members are preferably coupled to each other with a screw member which is screwed in one of directions orthogonal to the direction of holding the fluid controller therebetween.

In this configuration, the heat-transfer members may be coupled to each other easily if only a space for tightening a male screw member is available on at least one side in the direction orthogonal to the direction of holding the fluid controller therebetween.

The fluid control apparatus according to the invention includes: a flow rate controller; an opening-and-closing valve provided on one side of the flow rate controller; a plurality of passage blocks that support the flow rate controller and the opening-and-closing valve; a supporting member that supports the plurality of passage blocks; and a heating apparatus for the opening-and-closing valve, wherein the heating apparatus for the opening-and-closing valve corresponds to the above-described fluid controller heating apparatus.

With the fluid control apparatuses of this type, heating of a specific fluid controller is difficult, and thus heating efficiency is low. However, by using the fluid controller heating apparatus described above, heating aiming at a specific fluid controller (the opening-and-closing valve adjacent to the flow rate controller) with high degree of heating efficiency is achieved. In addition, since the heat-insulation performance is also superior, portions of the various fluid controllers having a control function, which are desirably free from temperature rise, may be prevented from increasing in temperature.

In the case where a pipe joint portion is provided on an end surface of the passage blocks that support the opening-and-closing valve opposite from the flow rate controller, the heater unit preferably includes a projecting portion that comes into abutment with the side surface of the passage block that supports the opening-and-closing valve.

In this configuration, not only the opening-and-closing valve, but also the passage blocks may be heated, and thus a further improvement of heating efficiency is achieved.

Advantageous Effects of Invention

According to the fluid controller heating apparatus of the invention, the heater unit includes a pair of heat-transfer members each including a plate-shaped heater fixed thereto, and the heat-transfer members are attached so as to hold the fluid controller therebetween and are configured to be capable of being coupled to each other, so that the heater unit is formed into a cylindrical shape. Therefore, heating is achieved not only from both sides of the fluid controller, but also from the entire periphery of the fluid controller, so that an improvement of the heating performance is achieved. Since the heat-insulation member surrounding the heater unit is also formed into a cylindrical shape, a superior heat-insulation performance is achieved. The heating apparatus may be installed by mounting the heat-insulation member, which is an integrated product, after the pair of heat-transfer members are mounted so as to hold the fluid controller therebetween from both sides. Therefore, installation is facilitated and is achieved with a small installation space.

BRIEF DESCRIPTION OF DRAWINGS

FIG. 7(a) is a side view illustrating a heater, and FIG. 7(b) is a front view of the same.

FIG. 8 illustrates a heat-insulating jacket in an exploded manner, in which FIG. 8(a) is a left side view, FIG. 8(b) is a plan view of the same, and FIG. 8(c) is a right side view of the same.

REFERENCE SIGNS LIST (1): fluid control apparatus, (2): flow rate controller (fluid controller), (3): opening-and-closing valve (fluid controller), (11): heater unit, (12) (13): heat-transfer members, (14) (15): heater, (16): heat insulation jacket (heat-insulation member), (17): hexagon socket head cap screw (screw member)

DESCRIPTION OF EMBODIMENTS

Figure 1:
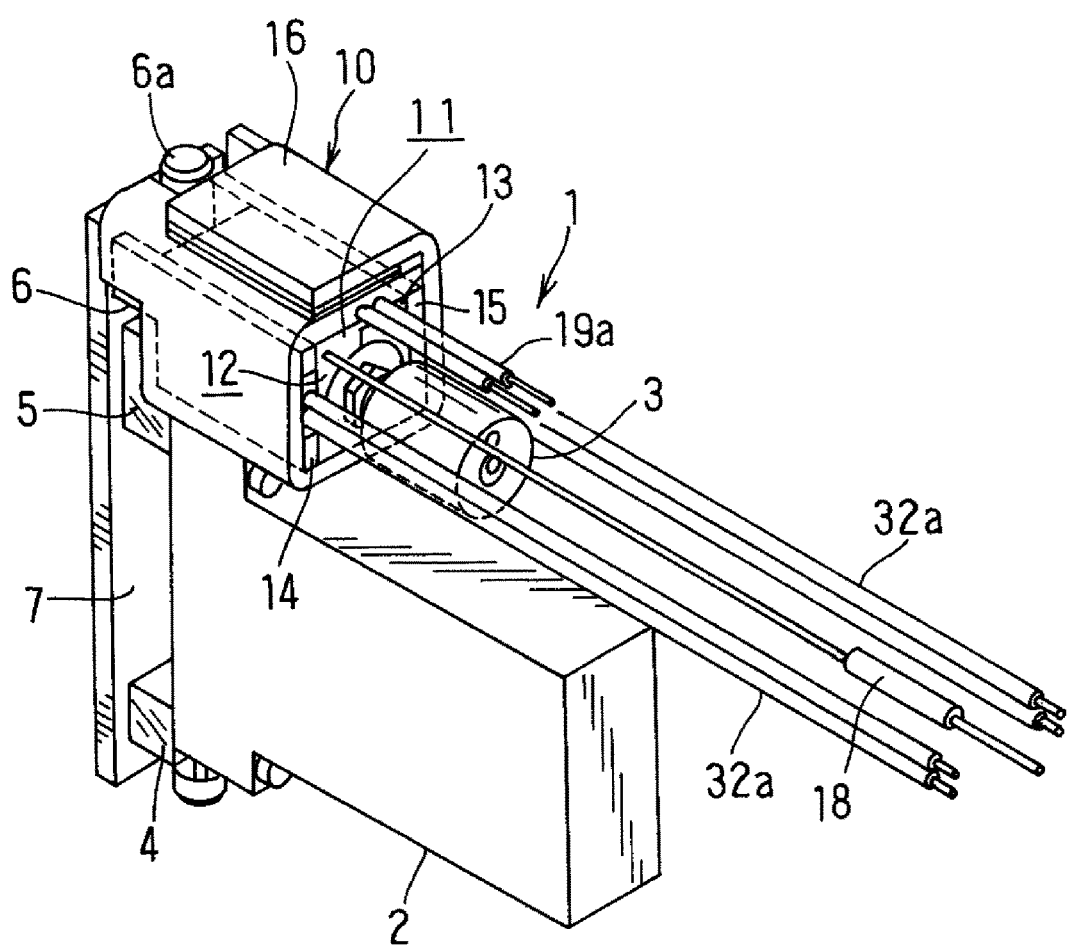
FIG. 1 is a perspective view illustrating an embodiment of a fluid control apparatus in which a fluid controller heating apparatus of the present invention is used.
Figure 2:
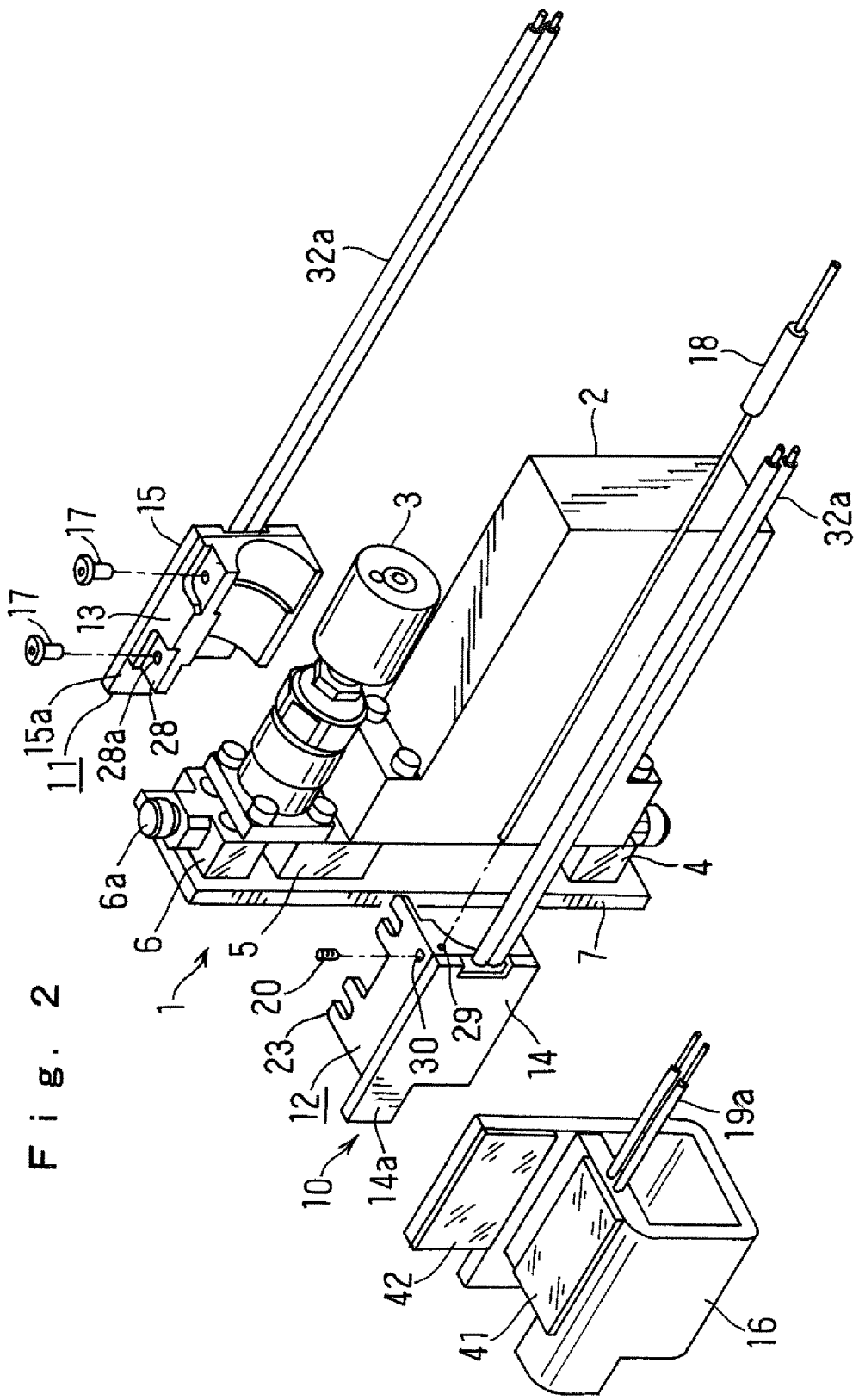
FIG. 2 is an exploded perspective view illustrating the fluid controller heating apparatus in FIG. 1 illustrating in an exploded manner.

Embodiments of the present invention will be described below with reference to the drawings. In a description given below, as regards an upper side and a lower side, a supporting member side in FIG. 1 and FIG. 2 is referred to as a lower side, and the opposite side is referred to as an upper side. A direction in which a plurality of fluid controllers are disposed in a line is referred to as a fore-and-aft direction, and a direction orthogonal both to the upper and lower direction and the fore-and-aft direction is referred to as a lateral direction. In the illustrated example, an opening-and-closing valve side is referred to as a front and a flow rate controller side is referred to as a rear.

FIG. 1 and FIG. 2 illustrate an embodiment of a fluid control apparatus of the invention, in which a fluid control apparatus (1) includes a plurality of fluid controllers (2) (3) mounted on a supporting member (7) via a plurality of passage blocks (4) (5) (6), in which a fluid controller heating apparatus (10) according to the invention is installed on a required fluid controller (that is, an opening-and-closing valve) (3).

In FIG. 1 and FIG. 2, the flow rate controller (2) and the opening-and-closing valve (3) disposed on a front side thereof are illustrated as the plurality of fluid controllers, and the fluid controller heating apparatus (10) is installed on the opening-and-closing valve (3). The opening-and-closing valve (3) is disposed so as to straddle across the two passage blocks (5) (6). The passage block (5) on a rear side out of the two passage blocks (5) (6) supports the front side of the flow rate controller (2), and the passage block (6) on the front side out of the two passage blocks (5) (6) is provided with a pipe joint portion (6a) that allows connection with external piping.

The fluid control apparatus (1) includes a plurality of lines disposed in parallel, each line being formed of some fluid controllers in addition to the illustrated one disposed in series in the fore-and-aft direction.

The fluid controller heating apparatus (10) includes a cylindrical heater unit (11) that surrounds a portion of the opening-and-closing valve (3) to be heated, and a heat insulation jacket (heat-insulation member) (16) that surrounds the heater unit (11).

The heater unit (11) includes a pair of metallic heat-transfer members (12) (13) (a first heat-transfer member (12) and a second heat-transfer member (13)) that are mounted on the opening-and-closing valve (3) to be heated from opposed left and right side surface sides and form a cylindrical shape as a whole to cover an outer peripheral surface of a required portion of the opening-and-closing valve (3), and plate shaped heaters (14) (15) fixed to the heat-transfer members (12) (13), respectively.

Figure 3:
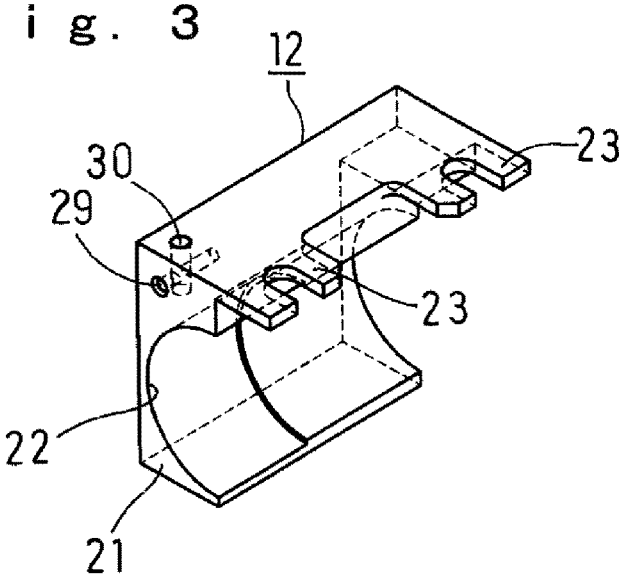
FIG. 3 is a perspective view illustrating a first heat-transfer member.
Figure 4:
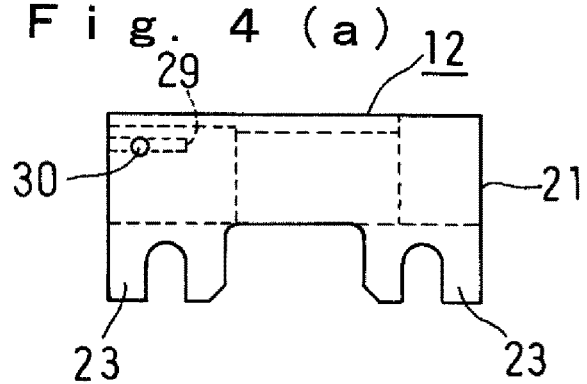
FIG. 4(a) is a front view illustrating the first heat-transfer member.
FIG. 4(b) is a plan view of the same.
FIG. 4(c) is a side view of the same.
Figure 4:
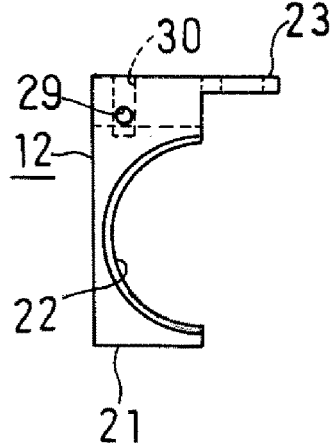
Figure 4:
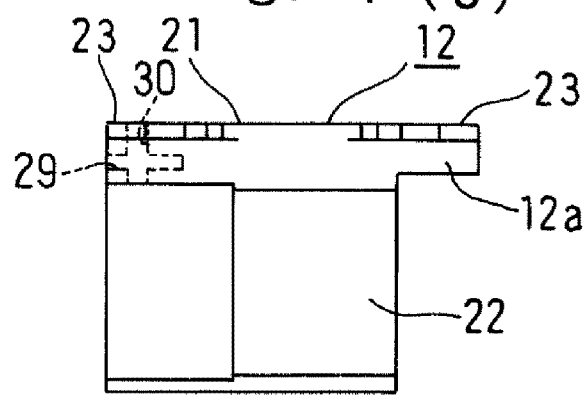

As illustrated also in FIG. 3 and FIG. 4, the first heat-transfer member (12) to be mounted on the opening-and-closing valve (3) from the left side is formed to have a substantially semicylindrical shaped depression (22) which corresponds to a portion of the opening-and-closing valve (3) to be heated on a right surface of a block shaped body (21).

Figure 5:
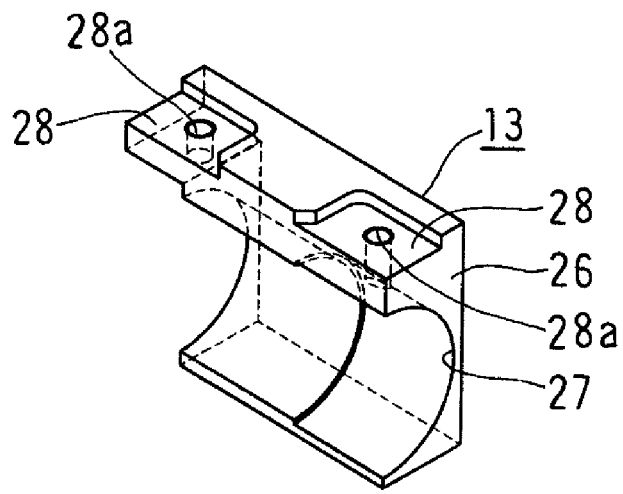
FIG. 5 is a perspective view illustrating a second heat-transfer member.
Figure 6:
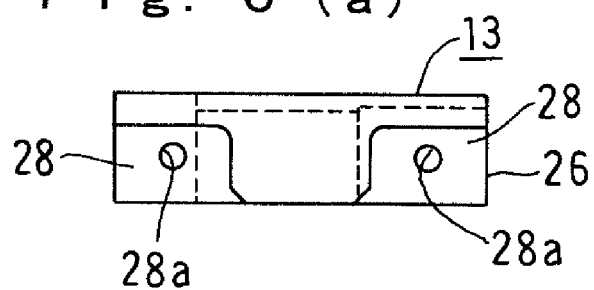
FIG. 6(a) is a front view illustrating a second heat-transfer member.
FIG. 6(b) is a plan view of the same.
FIG. 6(c) is a side view of the same.
Figure 6:
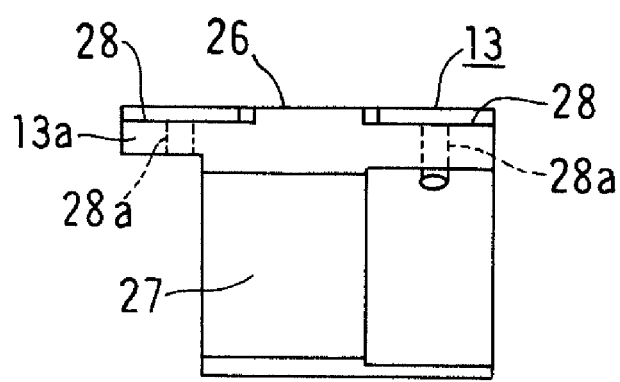
Figure 6:
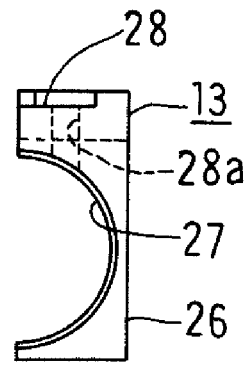

In the same manner, as illustrated also in FIG. 5 and FIG. 6, the second heat-transfer member (13) to be mounted on the opening-and-closing valve (3) from the right side is formed to have a substantially semicylindrical shaped depression (27) which corresponds to the portion of the opening-and-closing valve (3) to be heated on a left surface of a block shaped body (26). The depressions (22) (27) each have a stepped state corresponding to the portion to be heated of the opening-and-closing valve (3).

The shapes of the depressions (22) (27) of the heat-transfer members (12) (13) may have a shape other than a substantially semicylindrical shape, and shapes corresponding to portions to be heated of the opening-and-closing valve may also be employed.

The front surface of the body (21) of the first heat-transfer member (12) is provided with a pair of projecting portions (23) extending toward the opposed second heat-transfer member (13). Each projecting portion (23) has a U-shape when viewed from the front.

The front surface of the body (26) of the second heat-transfer member (13) is provided with depressions (28) in which the U-shaped projecting portions (23) of the first heat-transfer member (12) are fitted. The depressions (28) each include a female threaded bore (28a) formed at a position corresponding to just a center of the U-shaped projecting portion (23).

When the first heat-transfer member (12) and the second heat-transfer member (13) are abutted against each other, the U-shaped projecting portions (23) of the first heat-transfer member (12) fit into the depressions (28) of the second heat-transfer member (13). In this state, a hexagon socket head cap screw (screw member) (17) is screwed into the female screw (28a) via the projecting portions (23) so that the first heat-transfer member (12) and the second heat-transfer member (13) are coupled to each other.

Here, the front surface of the first heat-transfer member (12) having the projecting portions (23) formed thereon is a surface opposite to a surface adjacent to the flow rate controller (2), and the flow rate controller (2) does not become an obstacle when tightening the hexagon socket head cap screw (17).

A thermocouple insertion hole (29) is provided on an upper surface of the body (21) of the first heat-transfer member (12), and a distal end portion of a thermocouple (18) for measuring a heated temperature is inserted into the thermocouple insertion hole (29). A female screw (30) is formed on the front surface of the body (21) of the first heat-transfer member (12) so as to communicate with the thermocouple insertion hole (29), and the thermocouple (18) is fixed to the body (21) of the first heat-transfer member (12) by screwing a setscrew (20) into the female screw (30).

The heaters (14) (15) each include a case (31) formed of stainless steel, a heating portion (32) stored in the case (31) via an insulating mica and a power source lead wire (32a) as illustrated in FIG. 7. The heaters (14) (15) are fixed to an outer peripheral surface (a left surface of the body (21) of the first heat-transfer member (12) and a right surface of a body (26) of the second heat-transfer member (13)) of the corresponding heat-transfer members (12) (13) in advance so as to oppose each other via the flow rate controller (2).

The heat-transfer members (12) (13) and the heaters (14) (15) include projecting portions (12a) (13a) (14a) (15a), respectively, that come into abutment with the side surface of the passage block (6) that supports the opening-and-closing valve (3).

The power source lead wire (32a) and the thermocouple (18) of the heaters (14) (15) are drawn out above the opening-and-closing valve (3).

Figure 8:
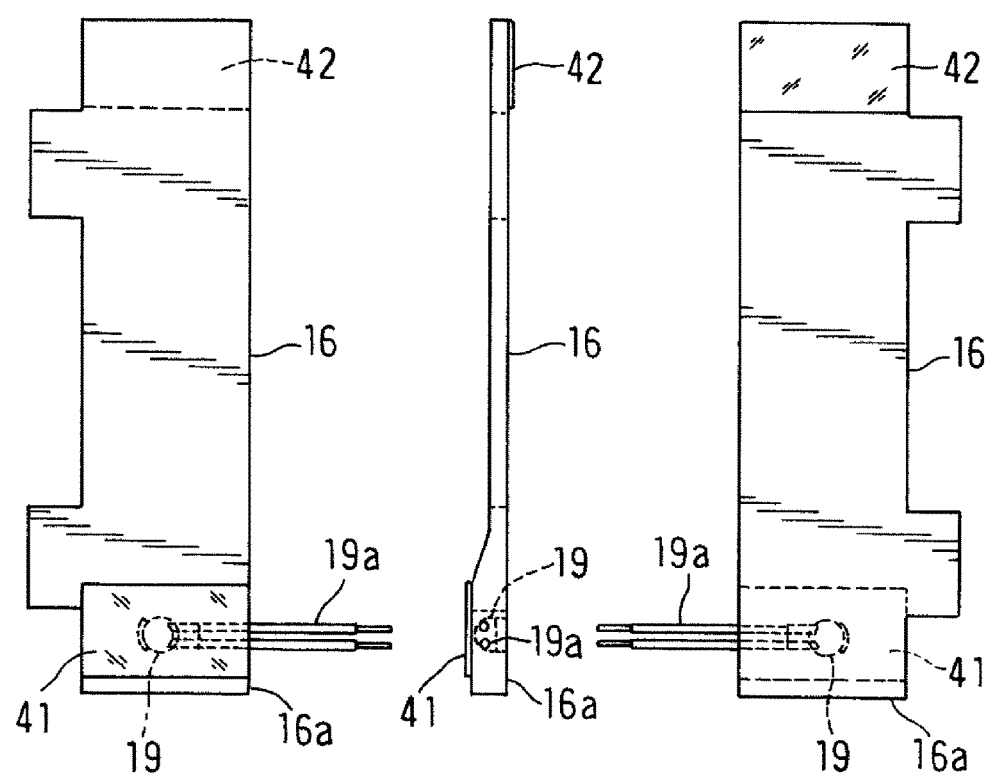

The heat insulation jacket (16) is formed of a synthetic resin sheet having flexibility and is installed by winding a band shaped member as illustrated in FIG. 8 around a periphery (outer peripheral surface) of the heater unit (11) as illustrated in FIG. 1 and FIG. 2. The synthetic resin is, for example, PTFE, but is not limited thereto. The heat insulation jacket (16) is provided with a male magic tape (registered trademark) (41) at one end thereof and a female magic tape (registered trademark) (42) at the other end thereof, respectively, in a band-shaped state.

A length of the band-shaped heat insulation jacket (16) corresponds to a length that exactly surrounds the heater unit (11) added with an end portion on which the female magic tape (42) can be attached. The end portion where the male magic tape (41) is provided is a thick portion (16a), and a thermostat (19) is disposed on the thick portion (16a) as illustrated in FIG. 8. The thermostat (19) is embedded into the thick portion (16a), and power source lead wires (19a) are taken above the opening-and-closing valve (3).

It is also possible to allow selection of a heat insulation jacket (16) by forming a through hole and a female screw portion or the like for fixation with a screw or the like.

The thermostat (19) switches the heaters (14) (15) ON and OFF on the basis of the temperature measured by the thermocouple (18). Accordingly, an adequate heated temperature is maintained, and heat to be transferred to outside is prevented from becoming too high.

As regards an installation of the above-described fluid controller heating apparatus (10), the pair of heat-transfer members (12) (13) provided with the heaters (14) (15) are mounted so as to hold the opening-and-closing valve (3) therebetween and are coupled to each other with the hexagon socket head cap screw (17), and the heat insulation jacket (16) is wound around the periphery thereof.

Each of the heat-transfer members (12) (13), the heaters (14) (15), and the heat insulation jacket (16) is formed so as to correspond to the opening-and-closing valve (3), which is a fluid controller to be heated, in shape and is formed while taking the shapes of the passage block (6) provided below the opening-and-closing valve (3) and the supporting member (7) that supports the passage block (6) into account. Accordingly, an interior of the opening-and-closing valve (3) and the fluid passages in the vicinity thereof may be heated efficiently, and heat-insulation performance is also secured.

In the above-described fluid control apparatus (1), the flow rate controller (2) is provided on the rear of the opening-and-closing valve (3), which may become an obstacle for installation of the fluid controller heating apparatus (10). However, with a configuration in which the pair of heat-transfer members (12) (13) of the heaters (14) (15) are mounted from both left and right sides and the hexagon socket head cap screw (17) is tightened from the front side, the fluid controller heating apparatus (10) may be installed without interfering the flow rate controller (2). The heat insulation jacket (16) may be installed by working from above the opening-and-closing valve (3), so that interference with the flow rate controller (2) is avoided. The thermostat (19) is mounted on the heat insulation jacket (16) in advance. The thermocouple (18) may be installed without interference with the flow rate controller (2) by being inserted into the thermocouple insertion hole (29) of the body (21) of the first heat-transfer member (12) by working from above the opening-and-closing valve (3) and tightening the setscrew (20) from the front side.

With coupling of the pair of metallic heat-transfer members (12) (13) and installation of the heat insulation jacket (16) in this manner, installation of the fluid controller heating apparatus (10) is completed. Therefore, the fluid controller heating apparatus (10) may be installed easily with respect to the opening-and-closing valve (3) of the above-described fluid control apparatus (1), and a reduction in space for installation is also enabled.

INDUSTRIAL APPLICABILITY

According to the present invention, since the fluid controller heating apparatus superior in heating performance and heat-insulation performance and requiring only a small space for installation is achieved, the invention contributes to an improvement in performance of the fluid control apparatus that controls a fluid that requires to be heated.

The invention claimed is:

1. A fluid control apparatus comprising:
    a flow rate controller;
    an opening-and-closing valve provided on one side of the flow rate controller;
    a plurality of passage blocks that support the flow rate controller and the opening-and-closing valve;
    a supporting member that supports the plurality of passage blocks; and
    a fluid controller heating apparatus comprising:
        a heater unit surrounding a portion to be heated of the opening-and-closing valve; and
        a heat-insulation member surrounding the heater unit, wherein
        the heater unit includes a pair of heat-transfer members and a heater fixed to each of the pair of heat transfer members, and the heat-transfer members are attached so as to hold the opening-and-closing valve from both sides and are configured to be coupled to each other with a screw member which is screwed in a direction orthogonal to a direction in which the pair of the heat-transfer members come closer to be assembled and coupled from the both sides, and
        the heat-insulation member is an integrated product which surrounds the heater unit,
    wherein a pipe joint portion is provided on an end surface of one of the passage blocks opposite from the flow rate controller, and the heater unit includes a projecting portion that comes into abutment with a side surface of the passage block that supports the opening-and-closing valve.

2. The fluid control apparatus according to claim 1, wherein
    one of the pair of heat-transfer members is provided at least one projecting portion,
    the other of the pair of heat-transfer members is provided at least one depression, and
    the screw member is screwed into a female threaded bore formed in the depression via the projecting portion of the heat-transfer member so that the pair of heat-transfer members are coupled to each other.

3. The fluid control apparatus according to claim 1, wherein the heat-insulation member is formed into a shape by a flexible band-shaped sheet wound around the heater unit.

* * * * *